United States Patent
Brassil

(10) Patent No.: US 7,530,086 B2
(45) Date of Patent: May 5, 2009

(54) MEDIA PROGRAM TIMING AND IDENTITY DELIVERY METHOD AND SYSTEM

(75) Inventor: John T. Brassil, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 940 days.

(21) Appl. No.: 09/734,996

(22) Filed: Dec. 12, 2000

(65) Prior Publication Data

US 2002/0107940 A1 Aug. 8, 2002

(51) Int. Cl.
*H04N 7/10* (2006.01)
*H04N 7/025* (2006.01)

(52) U.S. Cl. ............... 725/32; 725/116; 709/231
(58) Field of Classification Search ........... 725/32, 725/34–36, 105; 709/203, 219, 231
See application file for complete search history.

(56) References Cited

U.S. PATENT DOCUMENTS

| | | | | |
|---|---|---|---|---|
| 5,652,615 A | * | 7/1997 | Bryant et al. ............ | 725/35 |
| 5,892,535 A | * | 4/1999 | Allen et al. ............. | 725/36 |
| 6,005,603 A | * | 12/1999 | Flavin .................. | 725/32 |
| 6,018,768 A | * | 1/2000 | Ullman et al. ........... | 725/110 |
| 6,487,721 B1 | * | 11/2002 | Safadi ................. | 725/36 |
| 6,615,039 B1 | * | 9/2003 | Eldering .............. | 725/42 |
| 2001/0000194 A1 | * | 4/2001 | Sequeira ............... | 725/39 |
| 2001/0037500 A1 | * | 11/2001 | Reynolds et al. ........ | 725/36 |
| 2002/0054068 A1 | * | 5/2002 | Ellis et al. ............ | 725/153 |

OTHER PUBLICATIONS

SMPTE Standard for Television—Transmission of Date and Time Zone Information in Binary Groups of Time and Control Code, Sep. 1, 1999, The Society of Motion Picture and Television Engineers, SMPTE 309M-1999, pp. 1-5.*
SMPTE Standard for Television, Audio and Film—Time and Control Code, Sep. 1, 1999, The Society of Motion Picture and Television Engineers, SMPTE 12M-1999, pp. 1-21.*

* cited by examiner

*Primary Examiner*—Christopher Kelley
*Assistant Examiner*—Farzana E Hossain

(57) ABSTRACT

A method and system for delivering program timing, structure, and identity information in media streams. Cues are utilized to indicate an event (e.g., a start or stop time of a program or program segment) whose precise timing is important to receivers. A server-side cue handling mechanism is provided for selectively generating cues based on configuration information and detected events. A client-side cue handling mechanism is provided for detecting cues and providing the cues to applications that can utilize the cues to perform a useful function or task.

36 Claims, 7 Drawing Sheets

MEDIA PROGRAM TIMING AND IDENTITY DELIVERY METHOD AND SYSTEM

FIELD OF THE INVENTION

The present invention relates generally to the broadcasting of media streams, and more particularly, to a media program timing and identity delivery method and system.

BACKGROUND OF THE INVENTION

Existing Internet streaming media protocols transport audio and video data in "raw" form. The audio and video data are "raw" in the sense that the data stream consists primarily of information sufficient for a computing device (e.g., a personal computer) to hear or view the information.

There are several media distribution software packages that are currently available for transmitting and receiving audio and video content across the Internet. These media distribution software packages include a server software that receives audio and video information provided from a media source, such as a database or a live source (e.g., a live feed), converts the audio and video information into data packets that are compliant with Internet protocols, and transmits or broadcasts the data packets across the Internet to end users. Client software (e.g., a media player) is also provided to the end-user for receiving the media stream (e.g., audio and video data packets) and for rendering the audio and video through a speaker and display, respectively. For example, two popular media client software packages are the Windows Media Player available from Microsoft Inc. and the RealPlayer available from RealNetworks Inc.

Unfortunately, the current media streams provide limited facilities to enable the provision of personalized content based on the preferences of the end-user. Furthermore, the current media streams do not have any mechanism for providing precise time synchronization that is needed for applications such as the insertion of local broadcasts or advertising.

Accordingly, it would be desirable for there to be a mechanism that can directly convey program structure and identity with both precision and granularity.

There have been some proposals to develop a mechanism to synchronize processing streams. A first approach utilizes a reference clock to start/stop the recording of a scheduled program. Unfortunately, this approach requires that the programs be precisely scheduled and leaves little or no opportunity for stations to transmit unplanned live content.

A second approach uses a pre-existing agreement about a sequence of numbers or timestamps. However, this approach requires complex protocols to exchange this information. Furthermore, the control protocol can fail. An example of the second approach is described in a publication entitled, "Program Insertion in Real-Time IP Multicasts." This publication describes a program insertion system architecture for mixing real-time audio and video streams originating from multiple, physically separated sources. The mixing of streams is decentralized and relies on new protocols to coordinate the transfer of session control between IP multicast sources.

Unfortunately, this approach suffers from the following disadvantages. First, the synchronization software is complex, thereby increasing system overhead and costs. Second, the approach operates only in networks that are capable of IP multicasting. Third, this approach may require extensive media packet buffering that may not be available at a particular stream processing point.

A third approach can use the initiation or suspension of packet flow to indicate program initiation or termination. However, this approach is essentially guesswork as to what is about to happen in a program. As with most guesswork, there are cases where the system guesses incorrectly. For example, a silent segment where no packets are sent in order to preserve bandwidth can be incorrectly interpreted as an actionable program change where no action is needed.

In summary, the prior art approaches only offer tolerable results at the expense of injecting complex mechanisms into the system that increase system overhead and costs. Furthermore, these approaches often have difficulty in maintaining tight time synchronization when processing streams. For example, many of these approaches fail to maintain precise time synchronization, thereby resulting in undesirable perceptible artifacts (e.g., visible and audible artifacts).

Consequently, it would be desirable to have a facility for generating, detecting and using program cues without requiring synchronized clocks, IP multicast, complex control protocols, or guesswork about program changes.

Based on the foregoing, there remains a need for a method and system for embedding program timing and identification cues in Internet media streams that indicate events whose timing is significant to receivers and that overcomes the disadvantages set forth previously.

SUMMARY OF THE INVENTION

According to one embodiment of the present invention, a method and system is provided for enriching media streams that are transmitted over a distributed network (e.g., the Internet) in order to facilitate the processing of the media streams at intermediate points or at the end user.

One aspect of the present invention is the provision of a method and system for delivering program timing, structure, and identity information in media streams. Cues are utilized to indicate an event (e.g., a start or stop time of a program or program segment) whose precise timing is important to receivers. A server-side cue handling mechanism is provided for selectively generating cues based on configuration information and detected events. A client-side cue handling mechanism is provided for detecting cues and providing the cues to applications that can utilize the cues to perform a useful function or task.

Another aspect of the present invention is to provide a signaling mechanism that provides a cueing protocol for delivering program timing, structure, and identity information in media streams.

BRIEF DESCRIPTION OF THE DRAWINGS

The present invention is illustrated by way of example, and not by way of limitation, in the figures of the accompanying drawings in which like reference numerals refer to similar elements.

DETAILED DESCRIPTION OF THE PREFERRED EMBODIMENT

A media program timing and identity delivery method and system for use in media broadcasting applications are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Content Delivery Network 100

Figure 1:
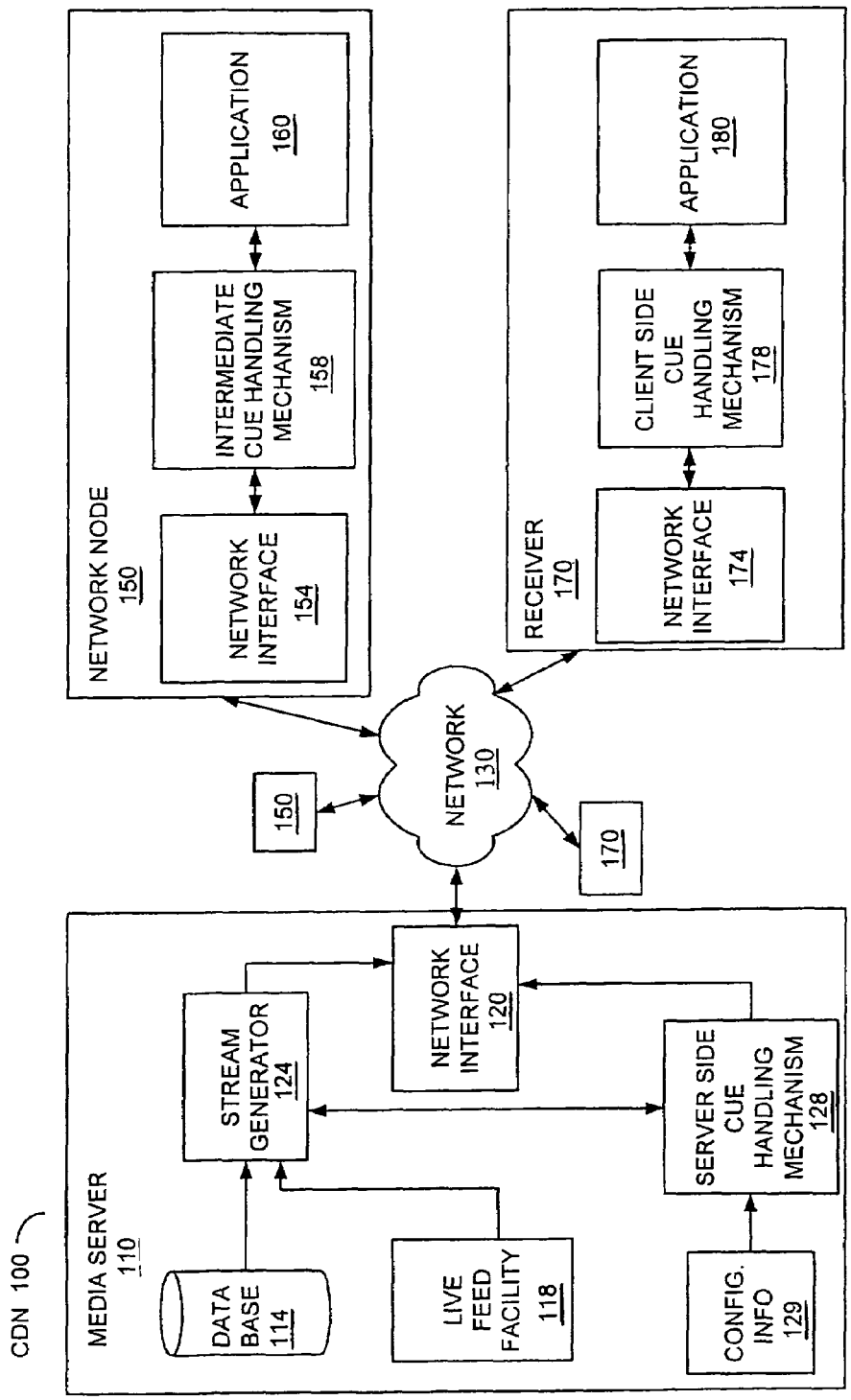
FIG. 1 is a block diagram illustrating an exemplary content delivery network in which the cue handling mechanism of the present invention can be implemented.

FIG. 1 is a block diagram illustrating an exemplary content delivery network (CDN) 100 in which the cue handling mechanism of the present invention can be implemented. The content delivery network 100 includes a media server 110 (also commonly referred to as a "content server" or a "streaming server") for providing media streams (e.g., audio streams, video streams, or audio/video (A/V) streams). The media server 110 is coupled via a network 130 (e.g., the Internet) to a network node 150 and a receiver 170.

The media server 110 includes a database 114 for storing media, a live feed facility 118 for providing live media (e.g., a live concert), a network interface 120 for communicating information with the network 130. A stream generator 124 is coupled to the database 114 and the live feed facility 118 for receiving the media streams, and based thereon, for generating corresponding data packets compliant with Internet protocols that are ready for transmission across the network 130.

The media server 110 also includes a server-side cue handling mechanism 128 for generating cue packets (also referred to herein as "cues") based on configuration parameters 129 that can, for example, be dependent on the specific media to be transmitted or broadcast or independent thereof. A cue is an elementary protocol message that indicates an event whose precise timing is significant or important to receivers. For example, a cue can be the start time or stop time of a program or program segment. A program or segment, as used herein, is defined to be a collection of transport layer media packets whose timestamps belong to a well-defined timestamp interval. For example, an Internet television station can use the cues of the present invention to delimit and label individual video presentations (e.g., a 30-minute prime-time television program) to facilitate recording by viewers using a video recording consumer appliance. The server-side cue handling mechanism 128 is described in greater detail hereinafter with reference to FIG. 2, and the processing steps performed thereby are described in greater detail hereinafter with reference to FIG. 3.

The receiver 170 can be any Internet connected or Web-enabled appliance, such as a personal computer (PC), a Web-enabled television appliance, Web-enabled cable television set-top appliance, portable laptop computer, personal digital assistant (PDA), Web-enabled video game appliance, etc. The receiver 170 includes a client-side cue-handling mechanism 178 for receiving packets, determining whether a packet is a cue packet, using the information contained in the cue packet for performing a particular function, and providing the cue packet to other applications. The client-side cue handling mechanism 178 is described in greater detail hereinafter with reference to FIG. 4, and the processing steps performed thereby are described in greater detail hereinafter with reference to FIG. 5. The receiver 170 also includes a network interface 174 for communicating information with the network 130. The receiver 170 can also include an application 180 that uses cues to perform a particular function. Examples of these applications are described in greater detail hereinafter.

The network node 150 also referred to herein as a network intermediary) can be, for example, a gateway or a proxy. The network intermediary 150 receives media streams, from one or more sources, processes the streams, and re-transmits one or more possibly modified streams to other network intermediaries or receivers. The network intermediary 150 can forward, remove, or add cues based on the usefulness of the cues to downstream devices. In other instances, media streams with embedded cues may be processed and then terminated (i.e., not forwarded) at the node.

The network node 150 includes a intermediary cue-handling mechanism 158 for receiving packets, determining whether a packet is a cue packet, using the information contained in the cue packet for performing a particular function, providing the cue packet to other applications (e.g., stream processing applications), adding or removing cue packets, and re-transmitting the media stream. The network node 150 also includes a network interface 154 for communicating information with the network 130. The network node 150 can also include an application 160 that uses cues to perform a particular function. An example of such an application 160 is a stream processing application that processes cues in the media stream and adds cues stream, removes cues from the stream, or terminates a program or segment.

Server-Side Cue Handling Mechanism 128

Figure 2:
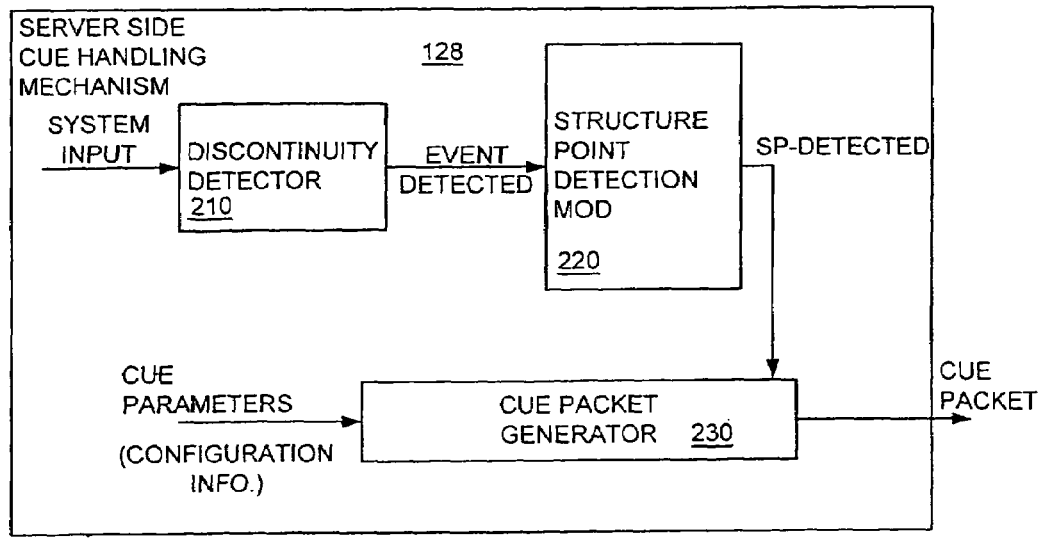
FIG. 2 illustrates in greater detail the server-side cue handling mechanism of FIG. 1 in accordance with one embodiment of the present invention.
Figure 3:
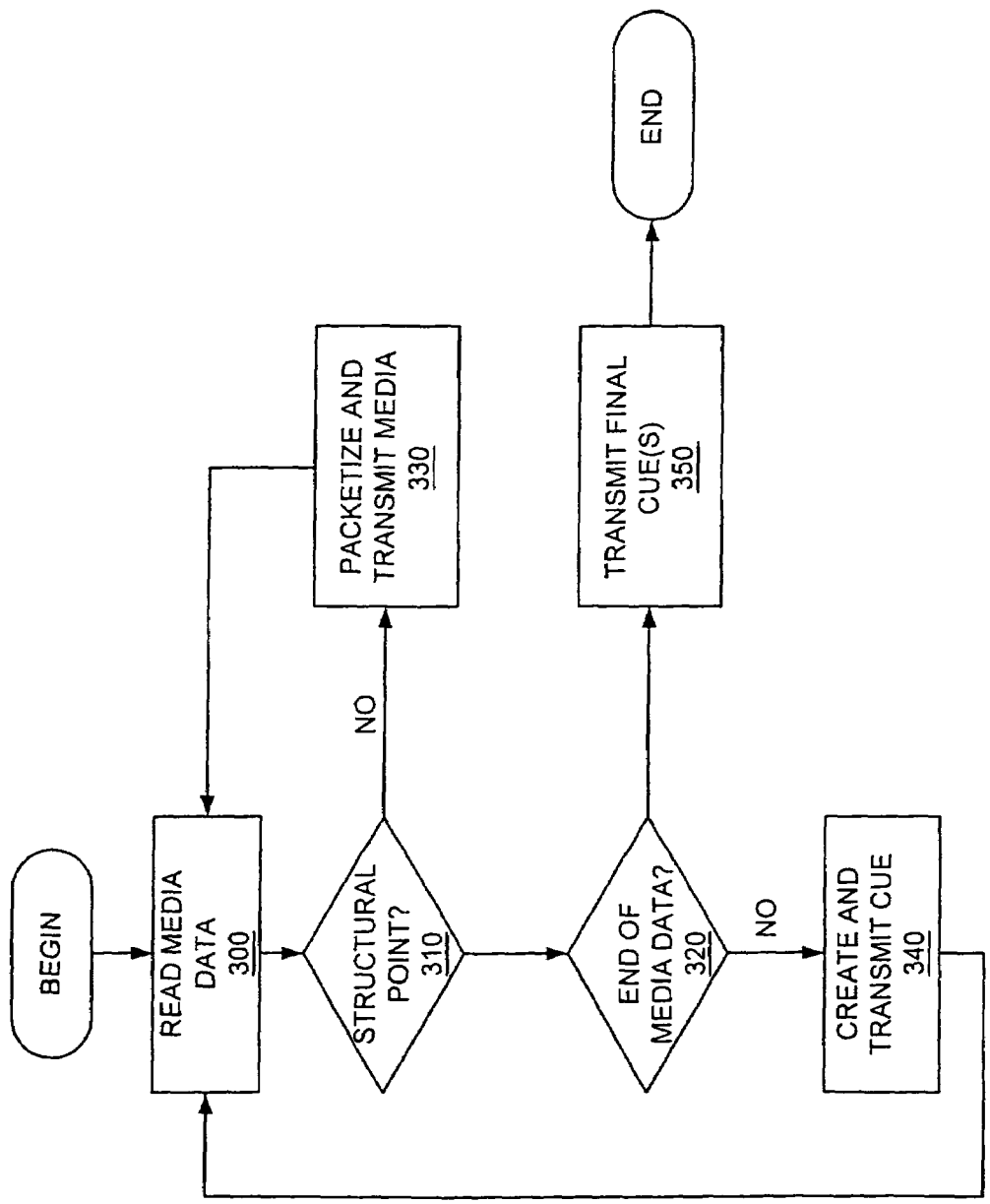
FIG. 3 is a flowchart illustrating the steps performed by the server-side cue handling mechanism in accordance with one embodiment of the present invention.

FIG. 2 and FIG. 3 illustrate how the server-side cue handling mechanism 128 of the present invention operates to add cues to the media stream at pre-determined structural points, such as at the beginning and end of each song. The term "structural point" as used herein refers to any point that has significance to the media being transmitted. It is noted that structural points depend on the content. Examples of structural points include a starting point and ending point of a program segment and the starting points and ending points of sub-segments within the program segment. For example, a radio station may have a structural point for each of the following events: when a new disc jockey arrives, when the disc jockey departs, when a new compact disc begins, when each compact disc is complete, when a new song begins, when each song ends, or even when a sub-segment (e.g., a drum solo in a song) begins and ends.

FIG. 2 illustrates in greater detail the server-side cue handling mechanism 128 of FIG. 1 in accordance with one embodiment of the present invention. The server-side cue handling mechanism 128 includes a discontinuity detector 210 for automatically detecting events based on system input and generating an event_detected signal. The server-side cue handling mechanism 128 also includes a structural point determination module 220 that is coupled to the discontinuity detector 210 for receiving the event_detected signal and configuration information, and based thereon, for automatically determining whether a structural point has been reached in the media stream and generating a structural point detected signal (SP_detected signal).

Alternatively, cues can be manually inserted by a human being (e.g., by holding a button that inserts a cue when pressed). For example, the director of a TV news program can manipulate a trigger or button to insert cues when something happens in a live program (i.e., a structural point in the program). This cue could later be used to identify a point in the program for a particular purpose (e.g., for extraction of an important photo opportunity).

The server-side cue handling mechanism 128 also includes a cue generator 230 that is coupled to the structural point determination module 220 for receiving the SP_detected signal and configuration information, and based thereon, for automatically generating an appropriate cue and transmitting the cue across the network 130.

For example, a configuration file is examined to inform a server whether certain classes of cues should be issued. Consider the example of a broadcaster who sends to an affiliate, who then forwards to a listener or viewer. A configuration file at the broadcaster's server can have a configuration file entry, such as <$private_{13}$ cues=YES>, which would instruct the broadcaster's server to generate cues in the stream intended for interpretation only by the affiliate and not other parties (e.g., the viewer). Similarly, the affiliate's server may have a configuration file entry, such as <forward_private_cues=NO>, which would instruct the affiliate's server to remove any cues the broadcaster sends which are indicated as private (i.e., do not send the cue to viewer).

FIG. 3 is a flowchart illustrating the steps performed by the server-side cue handling mechanism 128 in accordance with one embodiment of the present invention. In step 300, the media data is read. In step 310, a determination is made whether a structural point has been detected. When a structural point has been detected, then in step 320, a determination is made whether an end of media data has been reached. Processing then proceeds to step 340. In step 340, a cue is generated and transmitted. Thereafter, processing proceeds to step 300 where media data is read.

If a structural point has not been detected, then in step 330, the stream generator 224 packetizes and transmits the media data and proceeds to step 300 to continue to read media data. If the end of media data has been reached, then in step 350, one or more final cues may be generated and transmitted.

In summary, the server-side cue handling mechanism 128 starts, reads some media data, and performs a test to determine a structural point has been reached. If not, the server-side cue handling mechanism 128 utilizes the stream generator to simply packetize and transmit the media data. If a structural point has been reached (e.g., the end-of-file indicator of an audio file), then the server-side cue handling mechanism 128 determines if a program cue should be inserted. This determination can be performed, for example, by examining a configuration file that specifies whether a cue needs to be issued for this particular event. If a cue is required, the server-side cue handling mechanism 128 issues an appropriate cue. Otherwise, the server-side cue handling mechanism 128 simply returns to reading media data. When all media data has been read and transmitted, the server-side cue handling mechanism 128 can issue a final cue(s) and then end processing.

Client-Side Cue Handling Mechanism 178

Figure 4:
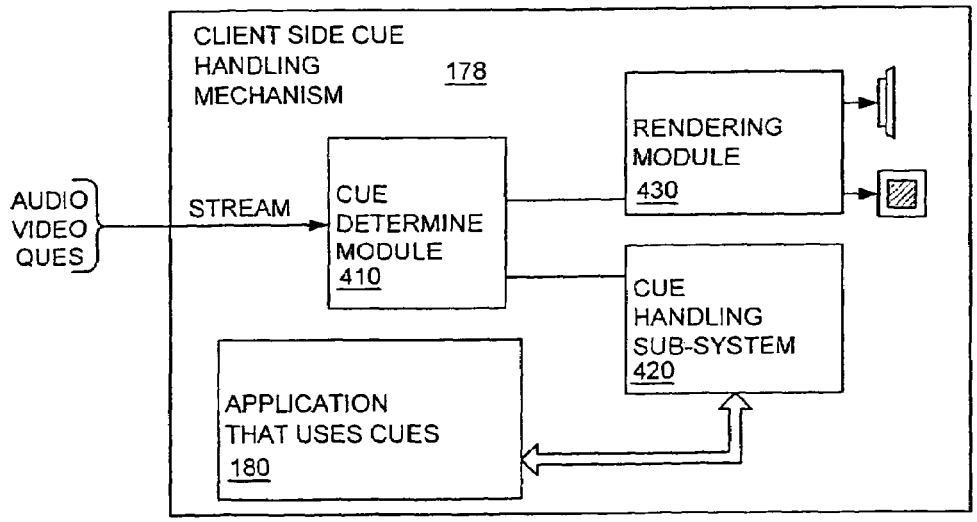
FIG. 4 illustrates in greater detail the client-side cue handling mechanism of FIG. 1 in accordance with one embodiment of the present invention.

FIG. 4 illustrates in greater detail the client-side cue handling mechanism 178 of FIG. 1 in accordance with one embodiment of the present invention. The client-side cue handling mechanism 178 includes a cue determination module 410 for receiving packets (e.g., audio packets, video packets, and cue packets) and determining whether the packets are cue packets. The client-side cue handling mechanism 178 also includes a cue handling sub-system 420 that is coupled to the cue determination module 410 for determining whether a cue packet requires some action or further processing. For example, if it is determined that a cue packet is important for some application, the information contained in the cue packet can be utilized by the cue handling sub-system 240 to perform some function. Information contained in the cue packet can be provided to an application 180 that uses cues.

A rendering module 430 is provided for receiving media packets and rendering the packets. For example, the rendering module 430 can send audio packets to speakers or video packets to a display.

Figure 5:
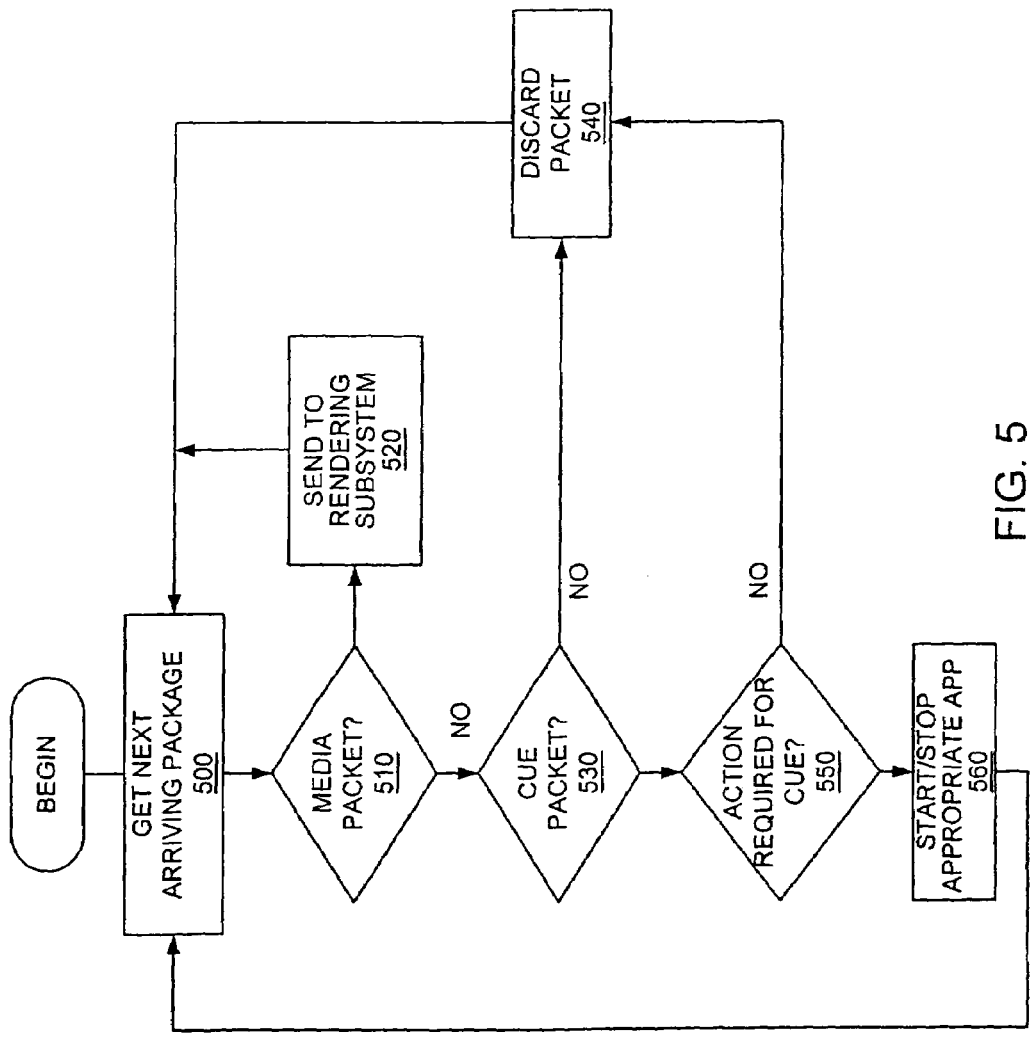
FIG. 5 is a flowchart illustrating the steps performed by the client-side cue handling mechanism in accordance with one embodiment of the present invention.

FIG. 5 is a flowchart illustrating the steps performed by the client-side cue handling mechanism 178 in accordance with one embodiment of the present invention. In step 500, a next data packet is received. In step 510, a determination is made whether the data packet is a media packet. If the data packet is a media packet, then in step 520, the media packet is sent to a rendering sub-system (e.g., a speaker for audio data and a display for video data), and processing continues at step 500. If the data packet is not a media packet, in step 530, a determination is made whether the data packet is a cue packet. If the data packet is not a cue packet, then in step 540, the packet is discarded, and processing continues at step 500.

If the data packet is a cue packet, then in step 550, a determination is made whether an action is required for the cue. If no action is required for the cue, then the processing proceeds to step 540. If an action is required, then in step 560, an appropriate action is processed (e.g., an application is started, stopped, provided information, or otherwise modified). For example, a cue can be utilized to start an application, end an application, or instruct an ongoing application to continue processing. Examples of such applications are described in greater detail hereinafter.

In summary, the client-side cue handling mechanism 178 detects and uses cues that are embedded in the media stream. After being started (by a user), the client-side cue handling mechanism 178, which is preferably embodied in a media client application, waits for the arrival of media packets. If a media packet arrives, then the media data is forwarded to a rendering subsystem to either play the audio or display the video. The client-side cue handling mechanism 178 then waits for the next incoming media packet. If a packet arrives that is neither a media packet nor a cue packet, the data packet is discarded. Upon detection of an arriving cue, the client-side cue handling mechanism 178 determines whether some action needs to be taken.

For example, if the cue identifies the beginning of a particular video segment, and a user wants to record the video, a recording application is invoked by the client program. The client-side cue handling mechanism 178 then returns to monitoring the incoming media stream for cues that may trigger an appropriate action.

Exemplary Cue Payload Format

In the preferred embodiment, the program cue is constructed by creating a new Real-Time Transport Protocol (RTP) payload type. Accordingly, cues can be distinguished from media packets of separate payload type when carried in-band. The payload format can be used for four principal types of signals: 1) Event Notification; 2) Event Termination; 3) Event Pending; and 4) Event Continuing. An Event Notification (EN) cue notifies the recipient of the initiation of an event. An Event Termination (ET) cue notifies the recipient of the completion of an event. An Event Pending (EP) cue notifies the recipient of an upcoming event. Depending on an application's requirements, a sender may issue multiple (e.g., redundant) EP cues associated with each event at various times prior to the beginning of the event. An Event Continuing (EC) cue notifies the recipient that an event is in progress. Depending on an application's requirements, a sender may issue multiple EC cues associated with each event at various times during an event. For example, EC cues can be utilized by an application to notify a recipient, who has recently joined a broadcast, of information about the on-going program.

It is noted that the program cue be adapted to can conform to other data transport protocols, such as those used to transport media data between Microsoft Windows Media Server and Microsoft Windows Media Player, or Real Networks RealServer and Real Networks RealPlayer.

One advantage of the cue handling mechanism of the present invention is the provision of an extensible protocol design that permits the addition of new cue types, that can be defined on an as-needed basis to suit a particular application.

Table I sets forth an exemplary encoding of the event type field in the cue payload format.

TABLE I

| ENCODING (DECIMAL) | EVENT TYPE |
|---|---|
| 0-10 | <reserved> |
| 11 | <advertisement> |
| 12 | <video-frame> |
| 13 | <interstice> |
| 14 | <audio-track> |
| 15 | <audio-segment> |
| 16 | <video-segment> |
| 17 | <program-title> |
| 18 | <program-description> |
| 19 | <program-label> |
| 20 | <content-type> |
| 21 | <program-advisory> |
| 22-1023 | <To Be Determined (TBD)> |
| >1023 | <Private, by Assignment> |

One advantage of the cue handling mechanism of the present invention is the provision of an extensible protocol design that permits the addition of new event types, that can be defined on an as-needed basis to suit a particular application. For example, an application developer can determine the appropriate event types for each application and decide how cues can be most effectively utilized for their specific purpose.

Use of RTP Header Fields

Figure 9:
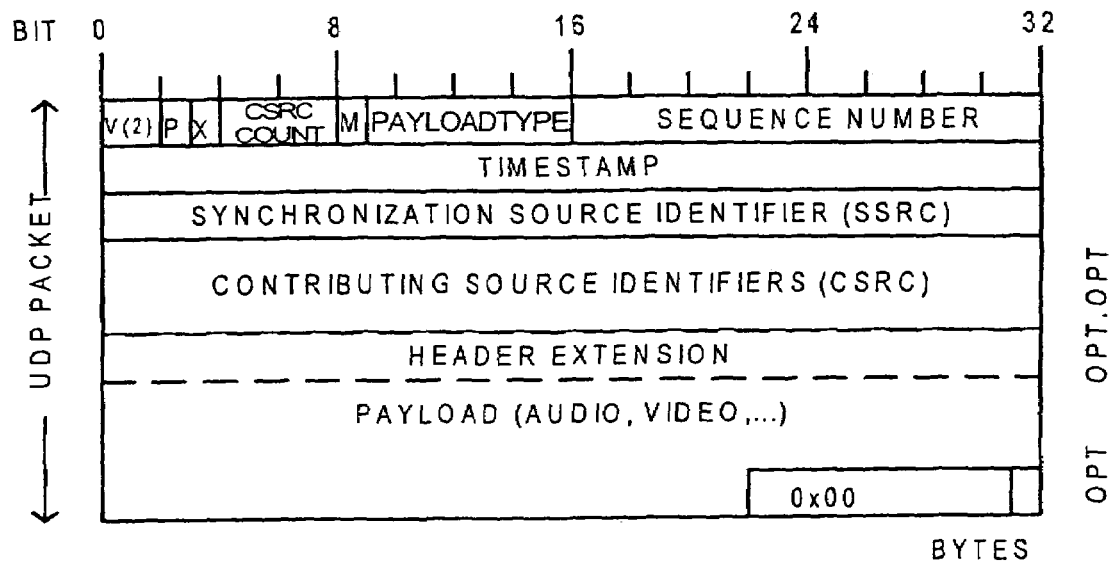
FIG. 9 illustrates an exemplary header format for a cue packet in accordance with one embodiment of the present invention.

FIG. 9 illustrates an exemplary header format for a cue packet in accordance with one embodiment of the present invention. RTP is an Internet standard protocol for transporting continuous media. Referring to FIG. 9, the first twelve bytes of the header are required. The synchronization source (SSRC) is a random number that uniquely identifies the source of an RTP packet stream. Packets from a synchronization source are distinguished by a timestamp and sequence number. These fields are used by receivers for proper signal reconstruction and playout timing. The initial sequence number value is also random and is incremented for each consecutively transmitted packet. Packets can and do arrive at their destination out-of-order.

The timestamp indicates the time of the sampling instant of the RTP payload relative to the initial timestamp value, which is random. The sampling rate for many audio/video-encoding formats is constant, well known, and registered with the Internet Assigned Numbers Authority (IANA). Other formats have time-varying sampling rates. Media formats are specified by the Payload Type (PT) field. Multiple packets can have the same timestamp as in the case where a large video frame is grabbed, encoded, but then transported in multiple packets.

A list of contributing source identifiers is present only if multiple RTP streams have been mixed. In this case, the CSRC count (CC) field indicates the number of contributors, and the CSRC list contains the original SSRC identifier of each contributing source.

The RTP header fields in cue packets are utilized in the following manner.

1. Timestamp: The RTP timestamp indicates the measurement point for the event indicated by the current packet. The event duration, as described hereinbelow, extends forward from that time. When sent in-band with media packets, the timestamp rate of cues is identical to the timestamp rate of the associated media.

2. Marker bit ("M" bit): In this embodiment, the marker bit is the ninth bit on the first line of the header. The RTP marker bit set to 1 indicates the beginning of an event, and the RTP marker bit set to 0 indicates the end of an event.

The payload format does not have a static payload type number, but instead uses a RTP payload type number that is established dynamically and out-of-band (e.g., via a session announcement).

Cue Payload Format

Figure 10:
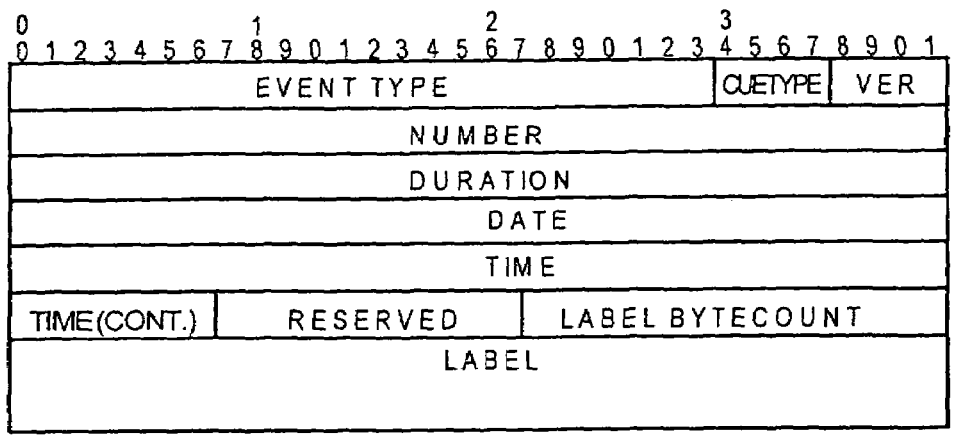
FIG. 10 illustrates an exemplary payload format for a cue packet in accordance with one embodiment of the present invention.

FIG. 10 illustrates an exemplary payload format for a cue packet in accordance with one embodiment of the present invention. Each field in the cue payload is defined as follows. An event type field specifies the event type that may be encoded as set forth hereinbelow in TABLE I. A cue type field specifies the significance of the cue. For example, cue_type=1 can indicate a notification (EN) cue packet; cue_type=2 can indicate a termination (ET) cue packet; cue_type=3 can indicate a pending (EP) cue packet; and cue_type=4 can indicate a continuation (EC) cue packet.

A version field identifies a cue command protocol version. A number field specifies a number that in combination with the event type specified by the event type field uniquely describes an event (i.e., the {event type, number} tuple uniquely describes a distinct event). The event type values can be random, sequential, or assigned by a numbering authority. If no identifier is utilized, the value 0x00000000 is used.

A duration field specifies the time remaining before completion of a specified event. For example, the duration field of an EP cue packet specifies the time before the expected occurrence of an associated pending event. The duration field of an EN cue packet specifies the expected time until the corresponding end of the event. The duration field of an ET cue packet is typically set to zero. However, the duration may be changed to a non-zero value when multiple ET cues are needed by an application. The duration field of an EC cue packet specifies the expected time until the end of the currently continuing event.

A date field specifies date information, and a time field specifies time information. Preferably, the date field includes data information that is encoded with a Society of Motion Picture and Television Engineer's (SMPTE) date encoding, and the time field includes time information that is encoded with a Society of Motion Picture and Television Engineer's (SMPTE) time encoding.

A variable-length text field (i.e., the label field) stores text that is suitable for display. The text can, for example, be a Universal Resource Name or a token. A label byte count field specifies the length in bytes of the variable-length text field. A reserved field is currently unused, but reserved for future use.

Preferably, the cues, cue protocol, and cue handling mechanism of the present invention are utilized for time-sensitive program information. Other relatively time-insensitive information, such as weekly programming schedule announcement for an Internet television station or a future play list for an Internet radio station, can be communicated by other out-of-band communication mechanism. For example, the out-of-band communication mechanism can be HTTP, Session Description Protocol via Session Announcement Protocol.

Preferably, the cue packets of the present invention are sent with media packets. However, the cues of the present invention can be sent as a separate stream. In this regard, the cues can be sent on separate multicast groups or separate ports from the media. In either case, the configuration options need to be indicated out-of-band. Extensions (e.g., new attributes) can be used to communicate desired cue operation in both Session Description Protocol (SDP) and Real-Time Streaming Protocol (RTSP).

Applications that Use Cues

In a program insertion application, a program or a segment is placed within another program or within an interstice (i.e., a gap between programs). One use of program insertion is the dynamic placement of a commercial advertisement within an entertainment program. For example, in the cable television context, local insertions are routinely performed during an out-of-network commercial break by insertion equipment located at a cable television headend. For an Internet broadcast, program insertion can occur, for example, at or near a content delivery network's (CDN's) edge server at an Internet access point. In this context, the cues of the present invention can be utilized to demarcate an interstice (e.g., a commercial break) or a program segment that is suitable for replacement by another program segment (e.g., a local program).

Consider the following example. An Internet broadcaster issues an EP cue (event type 13) eight seconds prior to an interstice suitable for a program insertion. A network affiliate receives the notice and initiates setup of insertion equipment. A second, redundant notification is sent 0.5 seconds prior to a final RTP packet of the program segment preceding the interstice, providing the affiliate with an improved estimate of the upcoming interstice's start time. Subsequent to the final packet in the terminating program segment, an EN cue (event type 13) is issued. The downstream affiliate begins transmitting a new program to the user. This is preceded by the affiliate issuing an EN cue (event type 11). The broadcaster issues EC cues to the affiliate at 1-second intervals during the interstice. Immediately prior to transmitting a new program segment to the affiliate, the broadcaster issues an ET (event type 13) packet indicating the end of the interstice. The affiliate concurrently issues an ET (event type 11) to the viewer indicating the end of the inserted program. In this above example, no cues are forwarded to receivers by the network affiliate, and all cues transmitted by the broadcaster are removed from the stream.

In a program modification application, the content of the program is changed or otherwise modified. One example of a program modification application is overlaying a logo (e.g., a station identifier) on program content. The cues of the present invention can be utilized to specify points in the media stream where such an overlay is to occur. Another example of a program modification application is program blanking or removal. In blanking applications, program content can be removed from programs according to user preferences by using cues of the present invention. For example, if certain program content is accompanied by a parental advisory notice that can be indicated by cues of the present invention that content can be removed at the listener's or viewer's discretion. The cues of the present invention can also be utilized to implement local black outs of sporting events with market restrictions.

In a program switching application, programs for forwarding are selected from among one or more active streams being received. For example, emerging Internet radio stations and television stations can use a program switching application to personalize the content being provided. In this regard, the cues of the present invention can be utilized to personalize program content by monitoring and switching between active streams based on established listener or viewer preferences.

In a program adaptation application (also known as a "re-purposing application), the content of the program is manipulated on behalf of diverse receivers. For example, the cues of the present invention can be utilized to transcode a video stream for forwarding to receivers that otherwise are incapable of either receiving or rendering the original stream.

In a program recording application, a program or a segment of a program is captured for future playback. The cues of the present invention facilitate the recording by uniquely identifying program content and precisely indicating program start and end points.

Recording Application

Figure 6:
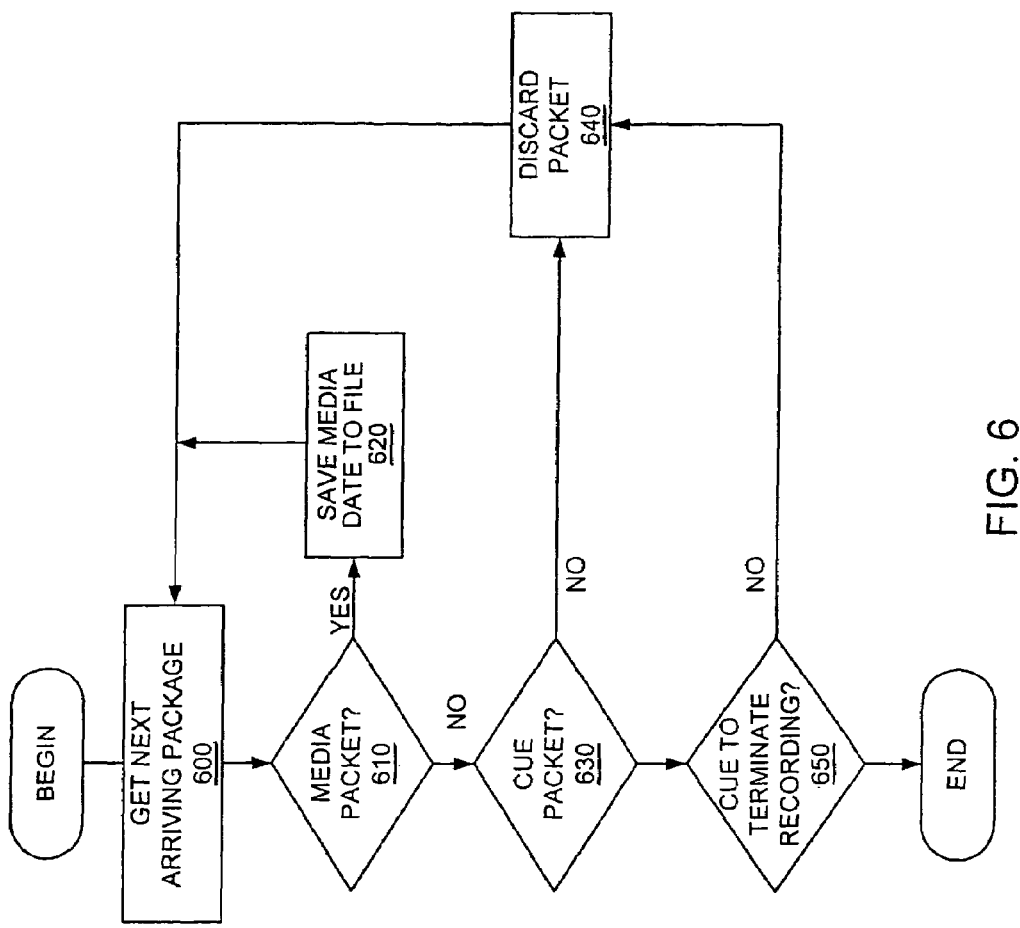
FIG. 6 is a flowchart illustrating the steps performed by a recording application that utilizes cues provided by the present invention in accordance with one embodiment of the present invention.

FIG. 6 is a flowchart illustrating the steps performed by a recording application that utilizes cues provided by the present invention in accordance with one embodiment of the present invention. In this unbuffered recording application, a media client application (e.g., client-side cue handling mechanism 178) receives a cue, queries its configuration instructions, and determines that a recording of the media is needed. To facilitate the recording the client-side cue handling mechanism 178 can call a media recording application in response to the arriving cue.

The un-buffered recording application can perform the following processing steps. In step 600, the next packet is received. In step 610, each arriving packet on the media stream is examined by the recording application. If it is a media packet, in step 620, the media packet is written to a file for storage. Then, the recording application returns to step 600 to wait for the next packet.

In decision block 630, a determination is made whether the packet is a cue packet. If the packet is not a cue packet, in step 640 the packet is discarded, and processing proceeds to step 600.

If an arriving packet is a cue packet, in decision block 650 a determination is made whether the cue is related to the recording application. If the cue packet is unrelated to this recording application, the packet is discarded (step 640). However, if the arriving cue is related to the recording application (e.g., a cue that indicates the end of the program to be recorded), the recording application terminates.

It is noted that the cues and the cue handling mechanism of the present invention can be utilized by other applications not specifically noted above. Since the cues and cue handling mechanism of the present invention provide tight time synchronization when processing streams, any application that needs precise time synchronization of streams would benefit from the present invention.

Figure 7:
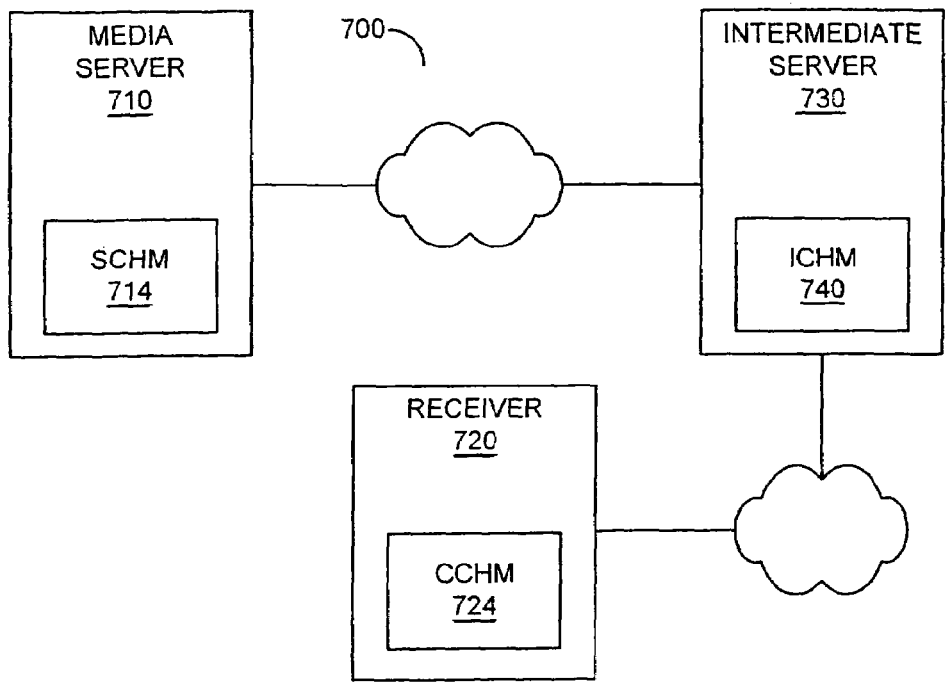
FIG. 7 is a block diagram illustrating an exemplary environment that includes an intermediate service server in which the cue handling mechanism of the present invention can be implemented.

FIG. 7 is a block diagram illustrating an exemplary environment 700 that includes an intermediate service server and in which the cue handling mechanism of the present invention can be implemented. The network 700 includes a media server 710 for providing media, a receiver 720 for receiving the media, and an intermediate service server 730. The media server 710 can include server cue handling mechanism (SCHM) 714 for inserting cues into the media stream. The receiver 720 can include a client cue handling mechanism (CCHM) 724 for detecting cues and using the cues for certain applications (e.g., recording a program).

The intermediate service server 730 can include an intermediate cue handling mechanism (ICHM) 740 for detecting cues sent by upstream servers (e.g., media server 710), deleting cues that are intended only for the intermediate service server 730, and adding cues to the media stream. These cues can be part of a value-added service or related to information concerning local programming that needs to be provided to the user (receiver 720).

Figure 8:
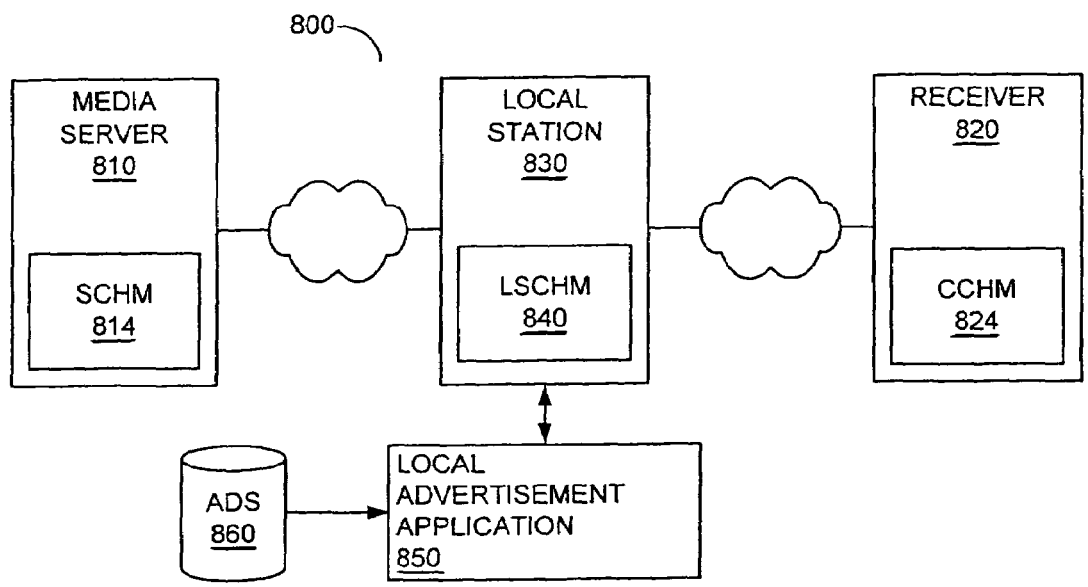
FIG. 8 is a block diagram illustrating an exemplary environment that has a local Internet radio station in which the cue handling mechanism of the present invention can be implemented.

FIG. 8 is a block diagram illustrating an exemplary environment 800 that has an Internet radio station in which the cue handling mechanism of the present invention can be implemented. The network 800 includes a media server 810 for providing media, a receiver 820 for receiving the media, and local station server 830. The media server 810 can include server cue handling mechanism (SCHM) 814 for inserting cues into the media stream. It is noted that some of these cues may be for use only by the receiver, other may be for the use of only the local station, and yet other cues may be for use by both the end user and intermediate servers (e.g., the local station server).

The receiver 820 can include a client cue handling mechanism (CCHM) 824 for detecting cues and using the cues for certain applications (e.g., recording a radio program).

The local station server 830 can include an intermediate cue handling mechanism (ICHM) 840 for detecting cues sent by upstream servers (e.g., media server 810), deleting cues that are intended only for the intermediate service server 830, and adding cues to the media stream. These cues can be part of a value-added service or related to information concerning local programming that needs to be provided to the user (receiver 820).

In this embodiment, a local advertisement application 850 is provided for inserting local advertisements in place of the national advertisements broadcast by the media server 810 that can be a national broadcasting station. The local advertisements can be provided by a local database 860. The local advertisement application 850 uses cues provided by the media server 810 to determine the start and end points of the national advertisements so that the local advertisements may be inserted in lieu thereof in a seamless fashion.

One advantage of the cues, cue protocol, and cue handling mechanism of the present invention is that the cue mechanism is independent of media encoding. Another advantage of the cues, cue protocol, and cue handling mechanism of the present invention is that the cue mechanism is independent of transport protocol. A further advantage of the cues, cue protocol, and cue handling mechanism of the present invention is the consistency with markers of other protocol layers. Another advantage of the cues, cue protocol, and cue handling mechanism of the present invention is that the cues can be separate and optional packets. A further advantage of the cues, cue protocol, and cue handling mechanism of the present invention is that the cues can operate in both in-band and out-of-band modes.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A streaming media server for providing media content in a plurality of media streams comprising:
    a detector for identifying an event in the media content and generating an event detection signal;
    a module for receiving the event detection signal and generating a structural point detection signal in response to determining, based on configuration information, that the event detection signal indicates that the event is a structural point having significance to the media content;
    a cue generator for receiving the structural point detection signal and the configuration information and based thereon for generating a private cue having a predefined structure, wherein the private cue is configured to be used by a stream processing application (SPA) of only specific affiliates to receive information concerning an event associated with the media content and, wherein the private cue is not interpreted by a third party other than the specific affiliates;
    a cue handling mechanism for embedding the private cue into one of the plurality of media streams with the media content to provide precise time synchronization for the processing of the one of the plurality of media streams by the SPA; and
    a network interface for transmitting the embedded private cue and the media content in the one of the plurality of media streams to the SPA of the specific affiliates.

2. The server of claim 1 wherein the private cue includes one of program timing, program structure, program identity, start time of a media program, and stop time of a media program.

3. The server of claim 1 wherein the stream processing application (SPA) is a program recording application.

4. The server of claim 1 wherein the stream processing application (SPA) is a program insertion application.

5. The server of claim 1 wherein the stream processing application (SPA) is a program modification application.

6. The server of claim 1 wherein the stream processing application (SPA) is a program adaptation application.

7. The server of claim 1 wherein the stream processing application (SPA) is a program switching application.

8. The server of claim 1 wherein the private cue includes time sensitive program information.

9. The server of claim 1 wherein the private cue includes a cue type that is one of an event notification cue, an event pending cue, an event termination cue, and an event continuing cue, and a user-defined custom cue.

10. The server of claim 1 wherein the predefined structure of the private cue includes at least one of the following fields:
    an event type field for specifying an event type;
    a cue type field for specifying a cue type;
    a version field for specifying a cue command protocol version;
    a number field for specifying a number that in combination with the event type specified by the event type filed uniquely describes an event;

a duration field for specifying the time remaining before completion of a specified event;
a date field for specifying date information;
a time field for specifying time information;
a label byte count field for specifying the byte count in bytes of a subsequent variable-length text field; and
a variable-length label field for storing text suitable far display.

11. The server of claim 10 wherein the event type field is one of an advertisement event type, a video-frame event type, an interstice event type, an audio-track event type, an audio-segment event type, an video-segment event type cue, program-title event type, program-description event type, program-label event type, content-typo event type, program-advisory, and riser-defined event type.

12. The server of claim 10 wherein the date field includes data information encoded with a Society of Motion Picture and Television Engineer's (SMPTE) date encoding and wherein the time field includes time information encoded with a Society of Motion Picture and Television Engineer's (SMPTE) time encoding.

13. A method for delivering information associated with a media program in a media stream to a stream processing application (SPA) comprising:
using a detector to identify an event in the media program of the media stream and generate an event detection signal;
using a module to receive the event detection signal and generate a structural point detection signal in response to determining, based on configuration information, dint the event detection signal indicates that the event is a structural point having significance to the media program;
using a cue generator for receiving the structural point detection signal and the configuration information and based thereon for generating a private cue packet to represent the structural point in response to determining that the event is a structural point, wherein the private cue packet is configured to be used by the stream processing application (SPA) of only specific affiliates to receive information concerning the event such that a third party does not interpret the private cue packet and;
embedding said private cue packet in said media stream with the media program to provide precise time synchronization for processing of the media stream by the SPA; and
transmitting said private cue packet and the media program in the media stream to the SPA of the specific affiliates.

14. The method of claim 13 wherein the step of generating a private cue packet to represent the structural point includes generating the private cue pocket automatically.

15. The method of claim 13 further comprising:
receiving a packet;
determining whether the packet is a private cue packet;
when the packet is a private cue packet then determining if the private cue packet triggers an action based on predetermined configuration parameters;
when the private cue packet triggers an action, using information from the private cue packet to perform a function;
otherwise, discarding the private cue packet.

16. A content distribution network comprising:
a media server for broadcasting a media program in at least one media stream to a stream processing application (SPA) of specific affiliates, the media program having at least one structural point; and
a server-side cue handling mechanism for delivering program timing, structure, and identity information related to the media program in the at least one media stream in the form of a private cue, the server-side cue handling mechanism comprising a detector identifying an event in die media program and generating an event detection signal, a module receiving the event detection signal and generating a structural point detection signal in response to determining, based on configuration information, that die event detection signal indicates that die event is a structural point having significance to the media program, and a cue generator receiving the structural point detection signal and the configuration information and based thereon for generating a private cue having a predefined structure, wherein the private cue is embedded in the at least one media stream with the media program to provide precise time synchronization for processing of the at least one media stream by the SPA of the specific affiliates, and wherein the private cue is configured to be used by a stream processing application (SPA) of only the specific affiliates such that the private cue is not interpreted by a third party other than the specific affiliates.

17. The network of claim 16 further comprising:
a client-side cue handling mechanism for receiving packets, determining that a particular packet is a private cue packet, and decoding program timing, structure, and identity information from the private cue packet.

18. The network of claim 17 further comprising:
an application coupled to the client-side cue handling mechanism for using the program timing, structure, and identity information of the media stream to perform an application function.

19. The network of claim 17 further comprising:
an intermediary stream processing application for receiving the media stream that includes the private cue packet, processing the media stream, and re-transmitting the media stream to one of other intermediary stream processing application and a client-side cue handling mechanism.

20. The network of claim 19 wherein processing the media stream includes processing at least one private cue packet.

21. The network of claim 19 wherein re-transmitting the media stream to one of other intermediary stream processing application and receivers includes adding at least one private cue packet to die media stream.

22. The network of claim 19 wherein re-transmitting the media stream to one of other intermediary stream processing application and receivers includes removing at least one private cue packet from the media stream.

23. The server of claim 1 further comprising:
a stream generator for generating said media streams.

24. The server of claim 1 wherein said cue generator is further operable to insert said generated private cue into a corresponding media stream to which said generated private cue relates.

25. The server of claim 1 wherein said private cue is generated as a Real-Time Transport Protocol (RTP) payload.

26. The network of claim 17 further comprising:
a server-side stream generator for generating said at least one media stream, wherein said cue handling mechanism inserts said private cue packet in teat least one media stream.

27. The network of claim 26 further comprising:
a server-side network interface for communicating said at least one media stream having said private cue packet inserted therein across a communication network to at least one client.

28. The network of claim 27 wherein said network interface broadcasts said at least one media stream having said private cue packet inserted therein to a plurality of clients.

29. A method comprising;
generating a media stream containing a media program at a stream generator of a media server;
using a detector to identify an event in the media stream and generate an event detection signal;
using a module to receive the event detection signal and generate a structural point detection signal in response to determining, based on configuration information, that the event detection signal indicates chat the event is a structural point having significance to die media program;
using a cue generator for receiving the structural point detection signal and the configuration, information and based thereon for generating, at a cue handling mechanism of the media server, a private cue packet to represent the structural point in response to determining that the event is a structural point, wherein the private cue packet is configured to be used by a stream processing application (SPA) of only specific client receivers to receive information concerning the structural point such dint the private cue packet is not interpreted by a third party;
embedding said private cue packet in said media stream with the media program; and
communicating said media stream and said private cue packer from said media server to at least one intermediary network node;
said at least one intermediary network node modifying, based at least in pan on said private cue packet, said media stream La generate a modified media stream; and
said at least one intermediary network node communicating said modified media stream to at least one of the specific client receivers.

30. The method of claim 29 further comprising:
said at least one client receiver processing said modified media stream to generate output to an end user.

31. The method of claim 29 wherein said modifying comprises:
adding at least one cue packet to the media stream.

32. The method of claim 29 wherein said modifying comprises:
removing said private cue packet front the media stream.

33. The method of claim 29 wherein said modifying comprises:
inserting a second media stream into said media stream.

34. The method of claim 33 wherein said second media stream comprises at least one advertisement.

35. The method of claim 29 wherein said media stream and said private cue pocket are communicated from said media server to a plurality of different intermediary network nodes, wherein each of said different intermediary network nodes comprises respective target client receivers to whom it communicates modified media stream generated thereby.

36. The method of claim 35 comprising:
generating, by a first of said intermediary network nodes, a first modified media stream; and
generating, by a second of said intermediary network nodes, a different modified media stream.

* * * * *

UNITED STATES PATENT AND TRADEMARK OFFICE
CERTIFICATE OF CORRECTION

| | |
|---|---|
| PATENT NO. | : 7,530,086 B2 |
| APPLICATION NO. | : 09/734996 |
| DATED | : May 5, 2009 |
| INVENTOR(S) | : John T. Brassil |

It is certified that error appears in the above-identified patent and that said Letters Patent is hereby corrected as shown below:

In column 5, line 33, delete "<private$_{13}$ cues=YES>," and insert -- <private_ cues=YES>, --, therefor.

In column 13, line 7, in Claim 10, delete "far" and insert -- for --, therefor.

In column 13, line 14, in Claim 11, delete "content-typo" and insert -- content-type --, therefor.

In column 13, line 15, in Claim 11, delete "riser" and insert -- user --, therefor.

In column 13, line 30, in Claim 13, delete "dint" and insert -- that --, therefor.

In column 13, line 52, in Claim 14, delete "pocket" and insert -- packet --, therefor.

In column 13, line 56, in Claim 15, after "cue packet" insert -- , --.

In column 14, line 6, in Claim 16, delete "die" and insert -- the --, therefor.

In column 14, line 10, in Claim 16, before "event detection" delete "die" and insert -- the --, therefor.

In column 14, fine 10, in Claim 16, after "that" delete "die" and insert -- the --, therefor.

In column 14, line 49, in Claim 21, delete "die" and insert -- the --, therefor.

In column 14, line 66, in Claim 26, delete "teat" and insert -- the at --, therefor.

In column 15, line 9, in Claim 29, after "comprising" delete ";" and insert -- : --, therefor.

In column 15, line 17, in Claim 29, delete "chat" and insert -- that --, therefor.

In column 15, line 18, in Claim 29, delete "die" and insert -- the --, therefor, In column 15, line 21, in Claim 29, after "configuration" delete ",".

In column 15, line 29, in Claim 29, delete "dint" and insert -- that --, therefor.

UNITED STATES PATENT AND TRADEMARK OFFICE
CERTIFICATE OF CORRECTION

PATENT NO. : 7,530,086 B2
APPLICATION NO. : 09/734996
DATED : May 5, 2009
INVENTOR(S) : John T. Brassil It is certified that error appears in the above-identified patent and that said Letters Patent is hereby corrected as shown below:

In column 15, line 34, in Claim 29, delete "packer" and insert -- packet --, therefor.

In column 16, line 2, in Claim 29, delete "pan" and insert -- part --, therefor.

In column 16, line 3, in Claim 29, delete "La" and insert -- to --, therefor.

In column 16, line 16, in Claim 32, delete "front" and insert -- from --, therefor.

In column 16, line 23, in Claim 35, delete "pocket" and insert -- packet --, therefor.

Signed and Sealed this

Twenty-fourth Day of November, 2009

David J. Kappos
*Director of the United States Patent and Trademark Office*